United States Patent
Fujiwara

(10) Patent No.: US 7,778,953 B2
(45) Date of Patent: Aug. 17, 2010

(54) DOCUMENT MANAGEMENT APPARATUS AND DOCUMENT MANAGEMENT METHOD

(75) Inventor: Akihiko Fujiwara, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 708 days.

(21) Appl. No.: 11/676,331

(22) Filed: Feb. 19, 2007

(65) Prior Publication Data

US 2008/0201636 A1   Aug. 21, 2008

(51) Int. Cl.
G06F 15/00 (2006.01)
G06F 15/18 (2006.01)

(52) U.S. Cl. .................... 706/62; 382/176; 715/700

(58) Field of Classification Search ............ 706/62; 382/176; 707/4
See application file for complete search history.

(56) References Cited

U.S. PATENT DOCUMENTS

| | | | |
|---|---|---|---|
| 2002/0065957 A1* | 5/2002 | Rubin | 709/330 |
| 2004/0128312 A1* | 7/2004 | Shalabi et al. | 707/103 R |
| 2006/0085442 A1 | 4/2006 | Fujiwara | |
| 2008/0154848 A1* | 6/2008 | Haslam et al. | 707/3 |

FOREIGN PATENT DOCUMENTS

JP    2005-043990    2/2005

* cited by examiner

Primary Examiner—Donald Sparks
Assistant Examiner—Kalpana Bharadwaj
(74) Attorney, Agent, or Firm—Turocy & Watson, LLP

(57) ABSTRACT

A document management apparatus according to the invention is aimed at easily processing, managing and reusing newly taken image data in accordance with user's needs. The apparatus includes: a document area analyzing unit; a text information analyzing unit; a text information semantic analysis unit; a managing unit; an integrated information presenting unit; and a user-designated semantic setting unit capable of allowing the user to change the semantics of the text information presented by the integrated information presenting unit and to set the changed semantics.

20 Claims, 20 Drawing Sheets

FIG.3

| IMAGE ID | AREA ID | COORDINATES | AREA TYPE | TEXT INFORMATION | SEMANTIC AREA INFORMATION |
|---|---|---|---|---|---|
| IMAGE 1 | a. | (10,10) (90,30) | CHARACTER | 2006/02/22 | DATE |
| IMAGE 1 | b. | (30,50) (110,80) | CHARACTER | ＊＊ TRADING | COMPANY NAME |
| IMAGE 1 | c. | (25,100) (105,120) | CHARACTER | 2,850 YEN | AMOUNT OF MONEY |

FIG.7

| IMAGE ID | AREA ID | COORDINATES | AREA TYPE | TEXT INFORMATION | SEMANTIC AREA INFORMATION |
|---|---|---|---|---|---|
| IMAGE 1 | a. | (10,10) (90,30) | CHARACTER | 2006/02/22 | DATE |
| IMAGE 1 | b. | (30,50) (110,80) | CHARACTER | * * TRADING | CUSTOMER |
| IMAGE 1 | c. | (25,100) (105,120) | CHARACTER | 2,850 YEN | AMOUNT OF MONEY |

| TEMPLATE ID | AREA ID | COORDINATES | AREA TYPE | SEMANTIC AREA INFORMATION |
|---|---|---|---|---|
| ESTIMATE 1 | a. | (10,10) (90,30) | CHARACTER | DATE |
| ESTIMATE 1 | b. | (30,50) (110,80) | CHARACTER | CUSTOMER |
| ESTIMATE 1 | c. | (25,100) (105,120) | CHARACTER | AMOUNT OF MONEY |

FIG.14

| IMAGE ID | AREA ID | COORDINATES | AREA TYPE | TEXT INFORMATION | SEMANTIC AREA INFORMATION |
|---|---|---|---|---|---|
| IMAGE 1 | a. | (10,10) (90,30) | CHARACTER | 2006/02/22 | DATE |
| IMAGE 1 | b. | (30,50) (110,80) | CHARACTER | ＊＊ TRADING | COMPANY NAME |
| IMAGE 1 | c. | (25,100) (105,120) | CHARACTER | 2,850 YEN | AMOUNT OF MONEY |
| IMAGE 2 | a. | (10,10) (90,30) | CHARACTER | 2006/03/20 | DATE |
| IMAGE 2 | b. | (30,50) (110,80) | CHARACTER | ▽△ TRADING | CUSTOMER |
| IMAGE 2 | c. | (25,100) (105,120) | CHARACTER | 3,120 YEN | AMOUNT OF MONEY |

FIG.18

| IMAGE ID | AREA ID | COORDINATES | AREA TYPE | TEXT INFORMATION | SEMANTIC AREA INFORMATION |
|---|---|---|---|---|---|
| IMAGE 1 | a. | (10,10) (90,30) | CHARACTER | 2006/02/22 | DATE |
| IMAGE 1 | b. | (30,50) (110,80) | CHARACTER | ✶ ✶ TRADING | COMPANY NAME |
| IMAGE 1 | c. | (25,100) (105,120) | CHARACTER | 2,850 YEN | AMOUNT OF MONEY |
| IMAGE 2 | a. | (10,10) (90,30) | CHARACTER | 2006/03/20 | DATE |
| IMAGE 2 | b. | (30,50) (110,80) | CHARACTER | ▽△ TRADING | COMPANY NAME |
| IMAGE 2 | c. | (25,100) (105,120) | CHARACTER | 3,120 YEN | AMOUNT OF MONEY |
| IMAGE 3 | a. | (10,10) (90,30) | CHARACTER | 2006/03/21 | DATE |
| IMAGE 3 | b. | (30,50) (110,80) | CHARACTER | △□ BANK | COMPANY NAME |
| IMAGE 3 | c. | (25,100) (105,120) | CHARACTER | 1,380 YEN | AMOUNT OF MONEY |

FIG.23

| IMAGE ID | AREA ID | COORDINATES | AREA TYPE | TEXT INFORMATION | SEMANTIC AREA INFORMATION |
|---|---|---|---|---|---|
| IMAGE 1 | a. | (10,10) (90,30) | CHARACTER | 2006/02/22 | DATE |
| IMAGE 1 | b. | (30,50) (110,80) | CHARACTER | ＊＊ TRADING | COMPANY NAME |
| IMAGE 1 | c. | (25,100) (105,120) | CHARACTER | 2,850 YEN | AMOUNT OF MONEY |
| IMAGE 2 | a. | (10,10) (90,30) | CHARACTER | 2006/03/20 | DATE |
| IMAGE 2 | b. | (30,50) (110,80) | CHARACTER | ▽△ TRADING | COMPANY NAME |
| IMAGE 2 | c. | (25,100) (105,120) | CHARACTER | 3,120 YEN | AMOUNT OF MONEY |
| IMAGE 3 | a. | (10,10) (90,30) | CHARACTER | 2006/03/21 | DATE |
| IMAGE 3 | b. | (30,50) (110,80) | CHARACTER | △□ BANK | COMPANY NAME |
| IMAGE 3 | c. | (25,100) (105,120) | CHARACTER | 1,380円 | AMOUNT OF MONEY |
| IMAGE 4 | a. | (10,10) (90,30) | CHARACTER | 2006/03/22 | DATE |
| IMAGE 4 | b. | (30,50) (110,80) | CHARACTER | ◎◎ TRANSPORT | DELIVERY DESTINATION |
| IMAGE 4 | c. | (25,100) (105,120) | CHARACTER | 4,220 YEN | AMOUNT OF MONEY |

DOCUMENT MANAGEMENT APPARATUS AND DOCUMENT MANAGEMENT METHOD

BACKGROUND OF THE INVENTION

1. Field of the Related Art

The present invention relates to a document management apparatus and a document management method for managing a document image.

2. Description of the Related Art

Traditionally, there has been a demand that a paper document should be taken into a computer as a document image from an input device such as a scanner and the content of the taken image should be converted to electronic data and thus reused.

In this case, a system is typical used in which layout information or text information as a result of OCR is extracted from the electronic document image information provided by converting the paper document into the electronic data, then the content is semantically analyzed to extract semantic area information, the respective pieces of information are associated with each other and registered as meta data in a database, and these data are stored in a state where they can be searched for.

Also, a system has been known in which the type of the original is determined on the basis of the type of extracted information or the position on the document image, the document image information is converted to a structured document, and the storing place or the transmission destination of the document is decided. See JP-A-2005-43990.

However, in such traditional systems, for example, in the case where the user wants to change the meta data information to be extracted by automatic processing, the document images of all the input originals need to be analyzed each time to change the registration of the meta data. This will be a burden to the processing time and the user's operation, and the user cannot easily change the meta data. It lowers the convenience.

SUMMARY OF THE INVENTION

In view of the foregoing problems, it is an object of the present invention to provide a document management apparatus and a document management method in which, when storing meta data information analyzed and extracted by a system, means for presenting information to the user and easily correcting the information is provided, thereby enabling easy management of information desired by the user, and in which simplification of an information correction work by the user with respect to a template-like document is enabled by easily defining and registering the layout structure or the like of the document image in advance, and in which simplification of analysis processing for each document image and provision of highly accurate analysis results are enabled by defining and registering such a layout structure or the like in advance.

In order to solve the above problems, a document management apparatus according to an aspect of the invention includes: a document area analyzing unit configured to analyze and extract a document area from image data; a text information analyzing unit configured to analyze and extract text information with respect to the document area extracted by the document area analyzing unit; a text information semantic analysis unit configured to analyze and extract semantics of the text information from the text information extracted by the text information analyzing unit; a managing unit configured to associate the document area extracted by the document area analyzing unit, the text information extracted by the text information analyzing unit and the semantics of the text information extracted by the text information analyzing unit with each other, and manage them as integrated information; an integrated information presenting unit configured to present to a user at least the semantics of the text information, of the integrated information managed by the managing unit; and a user-designated semantic setting unit configured to be capable of allowing the user to change the semantics of the text information presented by the integrated information presenting unit and to set the changed semantics.

Also, a document management apparatus according to an aspect of the invention includes: document area analyzing means for analyzing and extracting a document area from image data; text information analyzing means for analyzing and extracting text information with respect to the document area extracted by the document area analyzing means; text information semantic analysis means for analyzing and extracting semantics of the text information from the text information extracted by the text information analyzing means; managing means for associating the document area extracted by the document area analyzing means, the text information extracted by the text information analyzing means and the semantics of the text information extracted by the text information analyzing means with each other, and managing them as integrated information; integrated information presenting means for presenting to a user at least the semantics of the text information, of the integrated information managed by the managing means; and user-designated semantic setting means for allowing the user to change the semantics of the text information presented by the integrated information presenting means, and setting the changed semantics.

Moreover, a document management method according to an aspect of the invention includes: analyzing and extracting a document area from image data; analyzing and extracting text information with respect to the document area; analyzing and extracting semantics of the text information from the text information; associating the extracted document area, the text information and the semantics of the text information extracted by analyzing the semantics of the text information with each other, and managing them as integrated information; presenting to a user at least the semantics of the text information, of the integrated information; and allowing the user to change the semantics of the presented text information and setting the changed semantics.

DESCRIPTION OF THE DRAWINGS

FIG. 3 shows an exemplary information management table saved in the semantic area information management module.

FIG. 7 shows an exemplary information management table saved in the semantic area information management module after the semantic area information setting is changed.

FIG. 14 shows an exemplary information management table saved in the semantic area information management module after the processing of analyzing a document image by calling a template.

FIG. 18 shows an exemplary information management table saved in the semantic area information management module after the new document image 3 is analyzed.

FIG. 23 shows an exemplary information management table saved in the semantic area information management module after the semantic area information is changed.

DESCRIPTION OF THE EMBODIMENTS

Hereinafter, embodiments of the invention will be described with reference to the drawings.

First Embodiment

Figure 1:
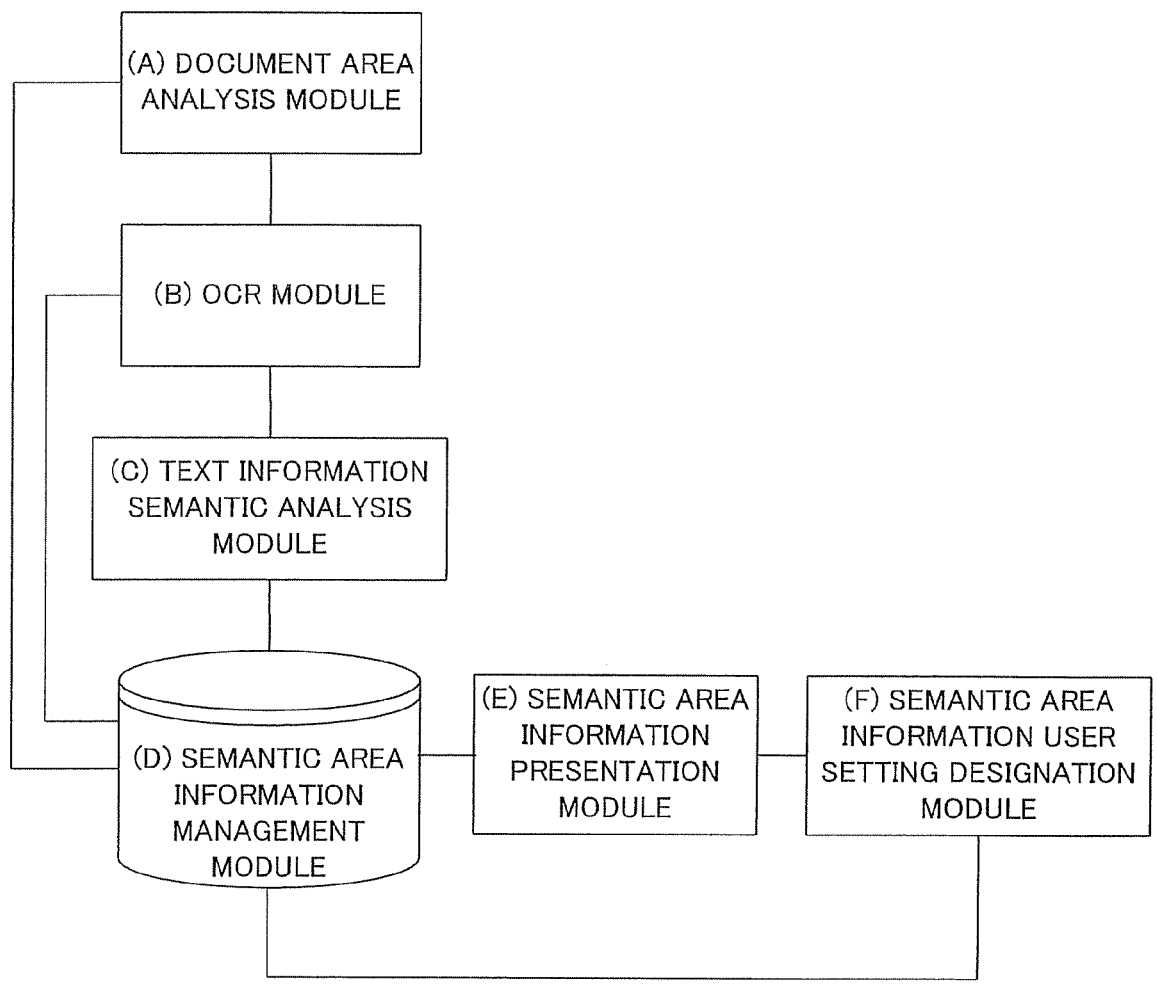
FIG. 1 is a block diagram showing the configuration of a document management apparatus according to a first embodiment of the invention.

FIG. 1 is a block diagram showing the configuration of a document management apparatus according to a first embodiment of the invention.

This document management apparatus has a document area analysis module (A), an OCR module (B), a text information semantic analysis module (C), a semantic area information management module (D), a semantic area information presentation module (E), and a semantic area information user setting designation module (F).

Here, the document area analysis module (A) is equivalent to a document area analyzing unit and document area analyzing means of the invention.

Also, the OCR module (B) is equivalent to a text information analyzing unit and text information analyzing means of the invention.

The text information semantic analysis module (C) is equivalent to a text information semantic analysis unit and text information semantic analysis means of the invention.

The semantic area information management module (D) is equivalent to a managing unit and managing means of the invention.

The semantic area information presentation module (E) is equivalent to an integrated information presenting unit and integrated information presenting means of the invention.

Moreover, the semantic area information user setting designation module (F) is equivalent to a user-designated semantic setting unit and user-designated semantic setting means of the invention.

In such a configuration of the document management apparatus, first, a document image taken in from an input device such as a scanner is sent to the document area analysis module (A).

Figure 2:
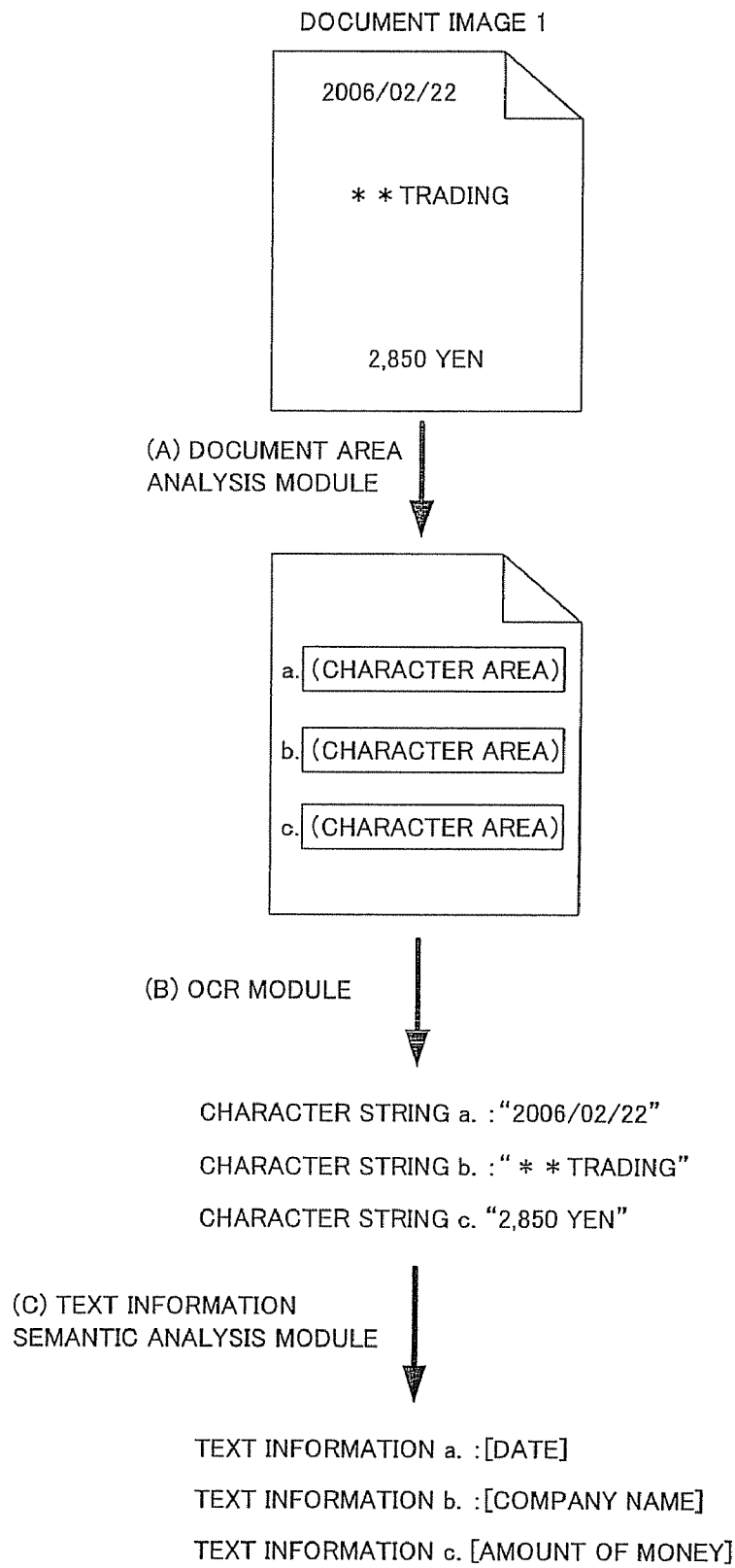
FIG. 2 is a view showing a flow of processing up to saving of a document image to a semantic area information management module.

As an example, a document image 1 that has been taken in is assumed to be a document image of an original having a character area for a date "2006/02/22", a character area for a company name "OX Trading", and a character area for an amount of money "2,850 yen on the original", as shown in FIG. 2.

First, the document area analysis module (A) analyzes the distribution of pixels in this document image, connects character candidate areas, and thus extracts character areas a, b and c. At the same time, the document area analysis module (A) analyzes the coordinates of the respective character areas in the document image and finds (X1, Y1) coordinates at the starting point and (X2, Y2) coordinates at the end point as numeric values. Here, as an example, the analysis shows the character area a has a starting point (10, 10) and an end point (90, 30), the character area b has a starting point (30, 50) and an end point (110, 80), and the character area c has a starting point (25, 100) and an end point (105, 120).

Next, the OCR module (B) analyzes the images of the character areas extracted by the document area analysis module (A). It extracts text information having character string information, that is, a character string a of "2006/02/22" from the character area a, a character string b of "** Trading" from the character area b, and a character string c of "2,850 yen" from the character area c.

Next, the text information semantic analysis module (C) analyzes the semantics of the text information extracted by the OCR module (B) and extracts "date" from the text information a, "company name" from the text information b, and "amount of money" from the text information c.

The information thus analyzed and extracted by the document area analysis module (A), the OCR module (B) and the text information semantic analysis module (C) is saved by the semantic area information management module (D) as integrated information associated with each other. Information including image ID, area ID, coordinates, area type, text information, and semantic area information is managed in a database, as shown in FIG. 3.

Figure 4:
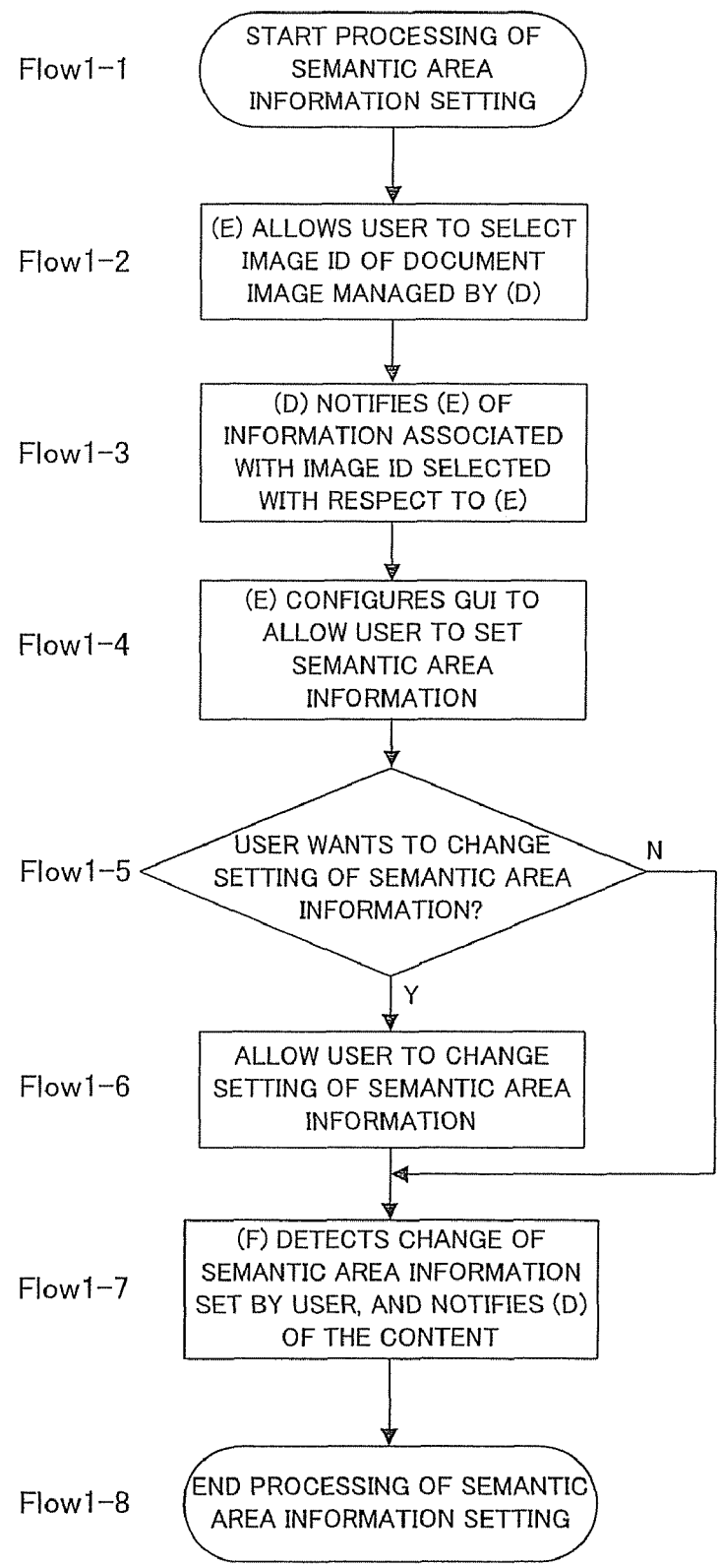
FIG. 4 is a flowchart showing a processing operation of semantic area information setting.

Next, processing in which semantic area information desired by the user is managed by the semantic area information management module (D) will be described with reference to the flowchart of FIG. 4. This is carried out as the semantic area information management module (D) allows the user to designate desired setting of semantic area information.

Figure 5:
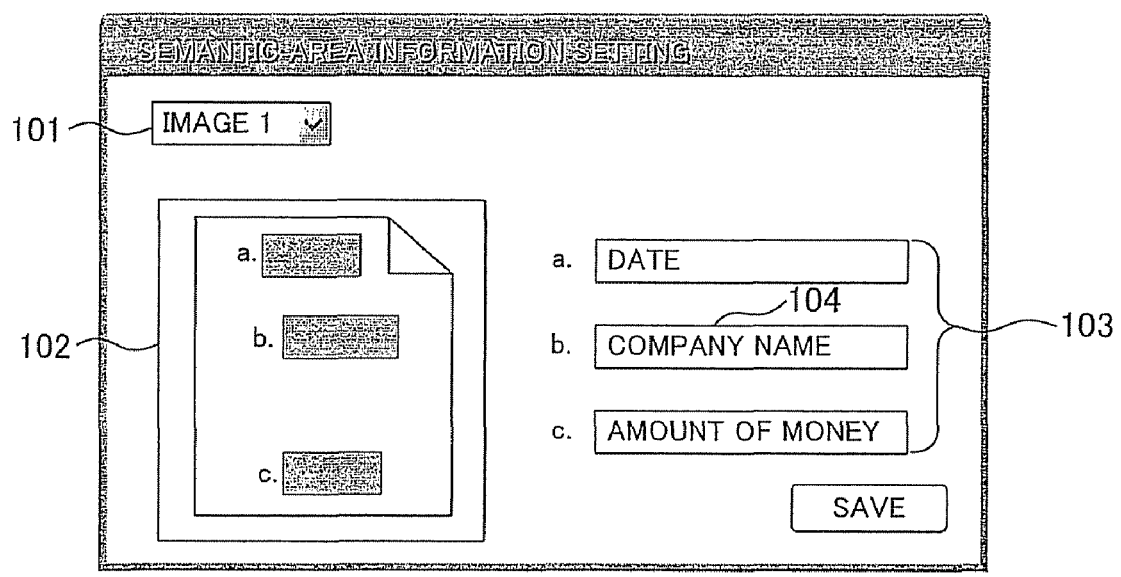
FIG. 5 shows an exemplary GUI presented to a user in order to set semantic area information.

First, as the processing is started (Flow 1-1), the semantic area information presentation module (E) presents to the user a GUI as indicated by 101 in FIG. 5 and thus allows the user to select the image ID of a document image managed by the semantic area information management module (D) (Flow 1-2).

As the user selects the corresponding image ID from the drop-down list of 101, the semantic area information management module (D) notifies the semantic area information presentation module (E) of the information about the area associated with the image ID selected with respect to the semantic area information presentation module (E) (Flow 1-3). Here, the semantic area information presentation module (E) is notified of the coordinates, area type, text information, semantic area information and the like with respect to the character areas a, b and c.

Next, the semantic area information presentation module (E) configures a GUI to allow the user to set semantic area information, on the basis of the area information which it has been notified of (Flow 1-4). For example, as indicated by 102 in FIG. 5, a picture image of the image 1 is displayed and the areas with area IDs are displayed on the picture image in accordance with the coordinate information of the areas. Also, semantic area information that the character area a indicates "date", the character area b indicates "company name" and the character area c indicates "amount of money", is displayed and presented to the user, as indicated by 103 in FIG. 5.

Here, if the user wants to change the setting of the semantic area information of these areas (if it is determined by the semantic area information presentation module that the user wants to change the setting) (Flow 1-5, Y), the user is allowed to change the setting (Flow 1-6).

Figure 6:
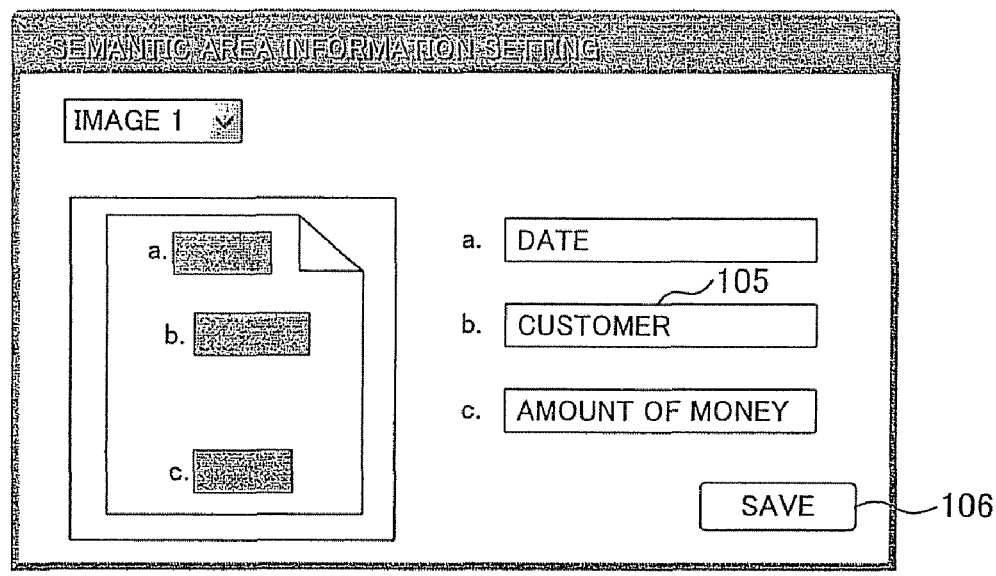
FIG. 6 shows an exemplary GUI in the case where the setting of semantic area information is changed in FIG. 5.

For example, if the user wants to change the semantic area information (104) of "company name" set for the character area b in FIG. 5 to semantic area information of "customer", the user changes the content of the area which the user wants to change, in the GUI presented by the semantic area information presentation module (E). Here, the user can designate a setting change by changing the semantic area information of the character area b from "company name" to "customer" as indicated by 105 in FIG. 6 and pressing a "save" button (106).

Next, the semantic area information user setting designation module (F) detects the designation of change in the semantic area information by the user, then notifies the semantic area information management module (D) of the content of the change, and changes the content managed by the semantic area information management module (D) (Flow 1-7). At this time, the information managed by the semantic area information management module (D) is changed as shown in FIG. 7.

In this manner, the processing of setting the semantic area information carried out by the user in the semantic area information management module (D) is completed.

Second Embodiment

Figure 8:
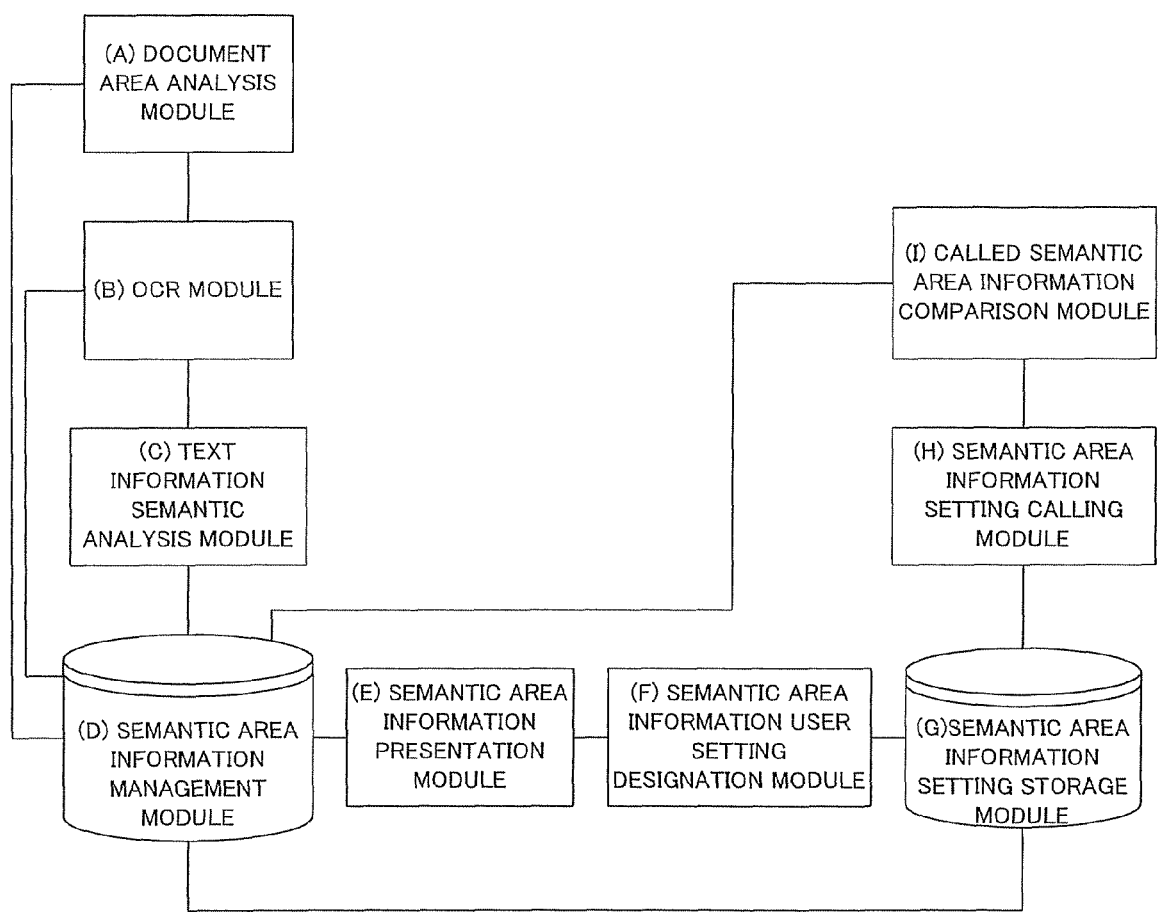
FIG. 8 is a block diagram showing the configuration of a document management apparatus according to a second embodiment of the invention.

FIG. 8 is a block diagram showing the configuration of a document management apparatus according to a second embodiment. In the block diagram of FIG. 8, a semantic area information setting storage module (G), a semantic area information setting calling module (H), and a called semantic area information comparison module (I) are added to the block diagram of FIG. 1.

Here, the semantic area information setting storage module (G) is equivalent to a template managing unit of the invention. The semantic area information setting calling module (H) and the called semantic area information comparison module (I) are equivalent to a semantic estimating unit of the invention.

Figure 9:
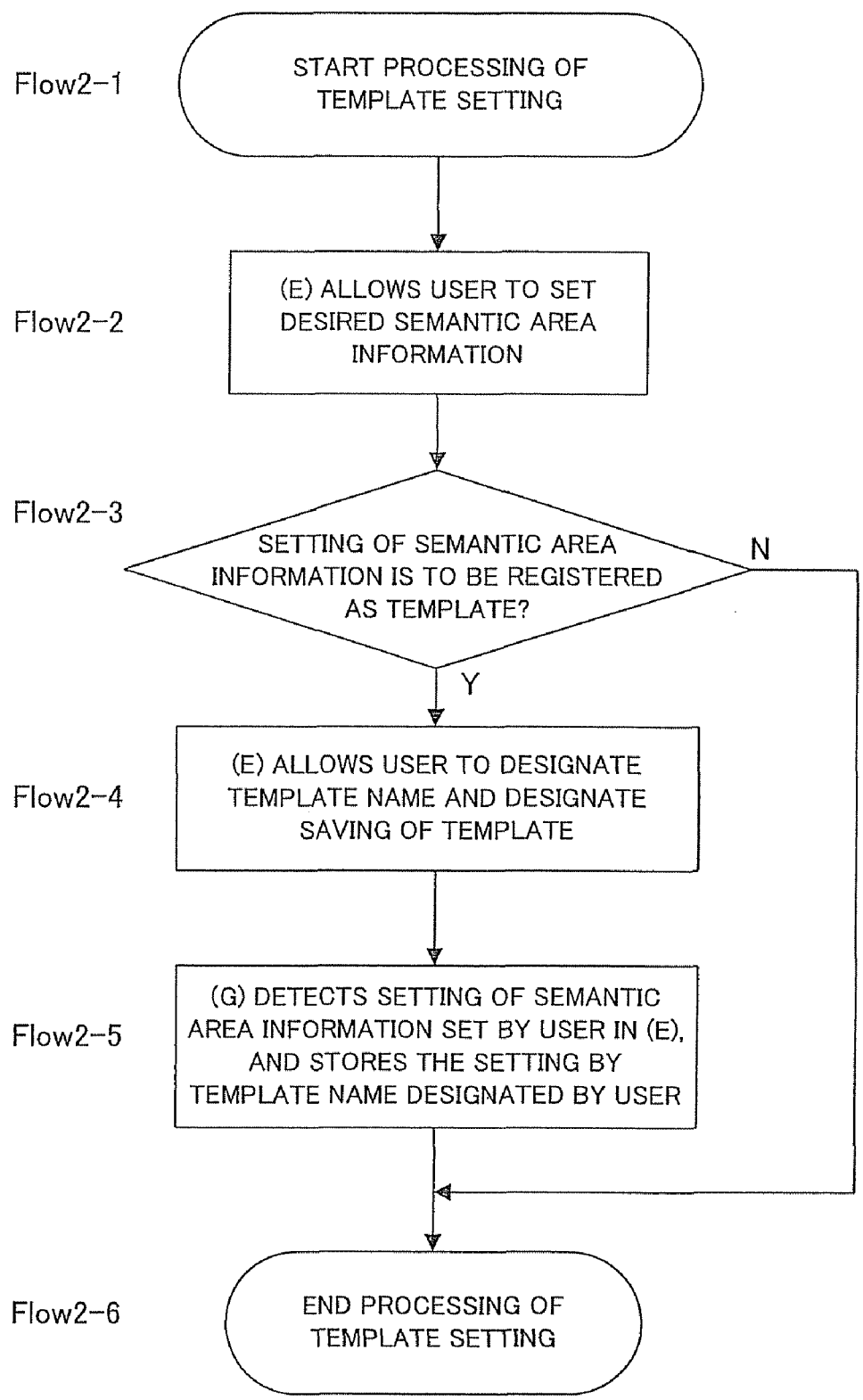
FIG. 9 is a flowchart showing a processing operation of template setting.

In the second embodiment, first, processing in which the content designated for setting of semantic area information by the user in the first embodiment is stored as a template in the semantic area information setting storage module (G), will be described with reference to the flowchart of FIG. 9.

As the processing is started (Flow 2-1), the semantic area information presentation module (E) presents the semantic area information with respect to a format having a specific layout structure of the document type selected by the user, and allows the user to set the semantic area information desired by the user (Flow 2-2).

Figures 10, 11:
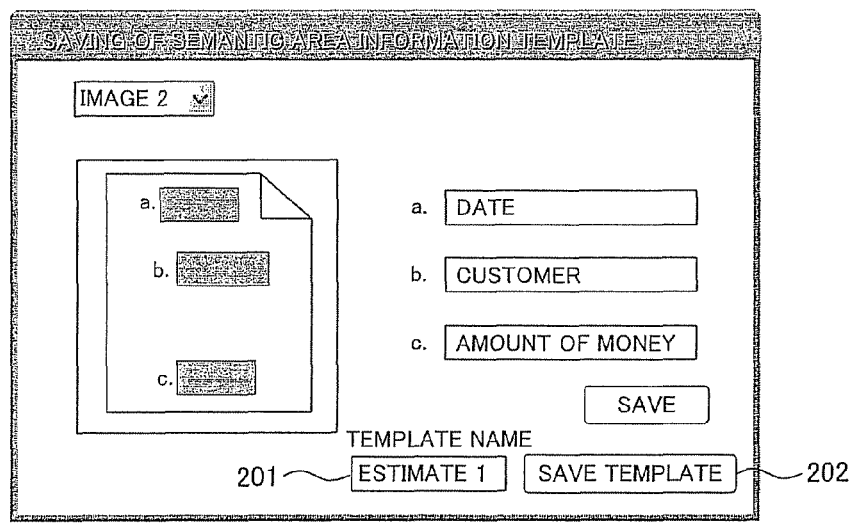
FIG. 10 shows an exemplary GUI presented to a user in the template setting.
FIG. 11 shows an exemplary information management table saved in a semantic area information setting saving module after the template setting.

For example, it is assumed that a document of estimate as shown in an image 2 of FIG. 10 has been frequently used in the user environment. This estimate is prepared in a format having a specific layout structure. If it is determined that the user wants to register the semantic area information of that format as a template (Flow 2-3, Y), the semantic area information presentation module (E) presents a GUI as shown in FIG. 10 to the user and allows the user to register the template that the user wants to register (Flow 2-4). Here, the template name can be designated as indicated by 201. The registration work is carried out by registering the template of the semantic area information of the corresponding document by the name of "estimate 1" and pressing a "template save" button 202.

The semantic area information setting storage module (G) detects the setting of the semantic area information set by the user in the semantic area information presentation module (E), and stores the setting content by the template name "estimate 1" designated by the user. In this case, the semantic area information setting storage module (G) stores information as shown in FIG. 11 into a database.

Figure 12:
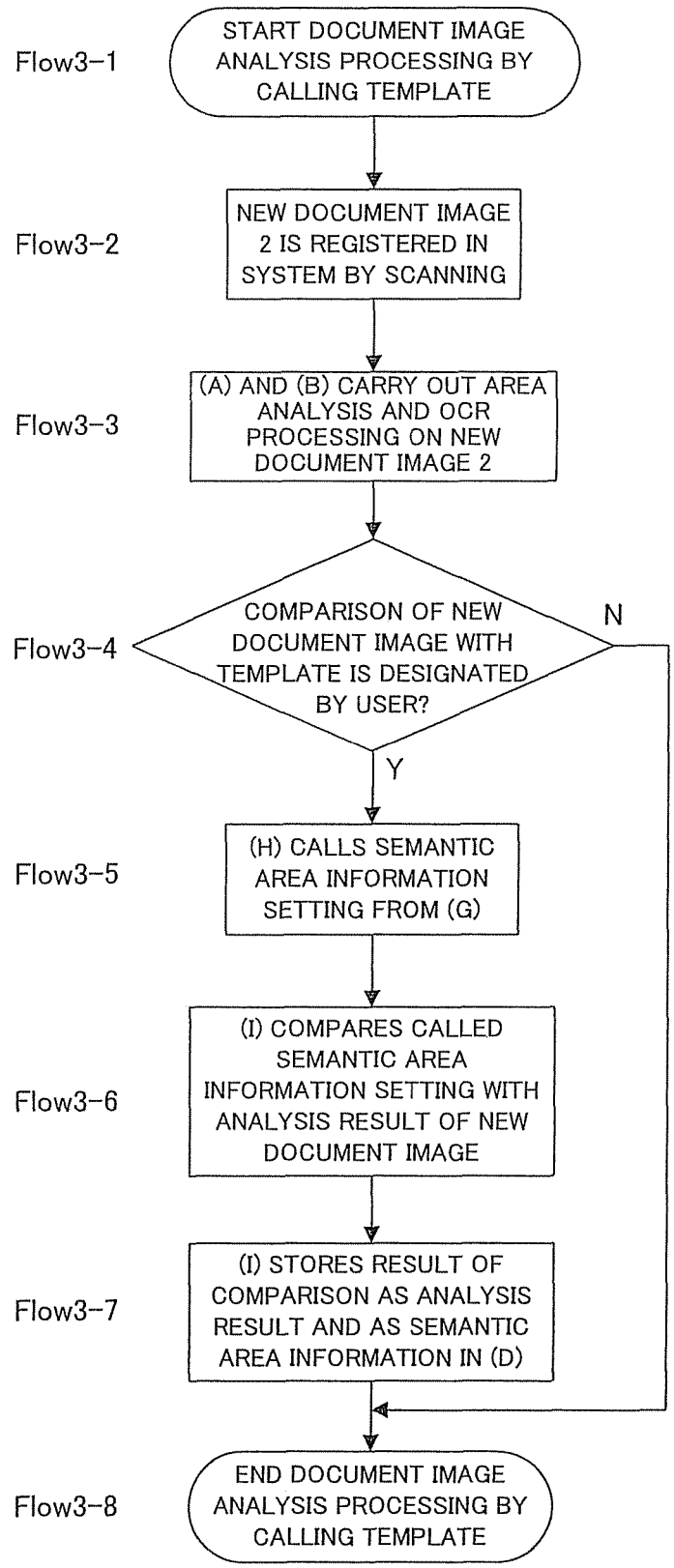
FIG. 12 is a flowchart showing a processing operation of analyzing a document image by calling a template.

Next, a process of calling the template information saved in the semantic area information setting storage module (G), then comparing a new document image as a processing target with the existing stored template information, and thereby deriving the semantic area information desired by the user with a small quantity of arithmetic operation, will be described with reference to the flowchart of FIG. 12.

As the processing is started (Flow 3-1), a new document image 2 is registered in the system by an input device such as a scanner (Flow 3-2).

Figure 13:
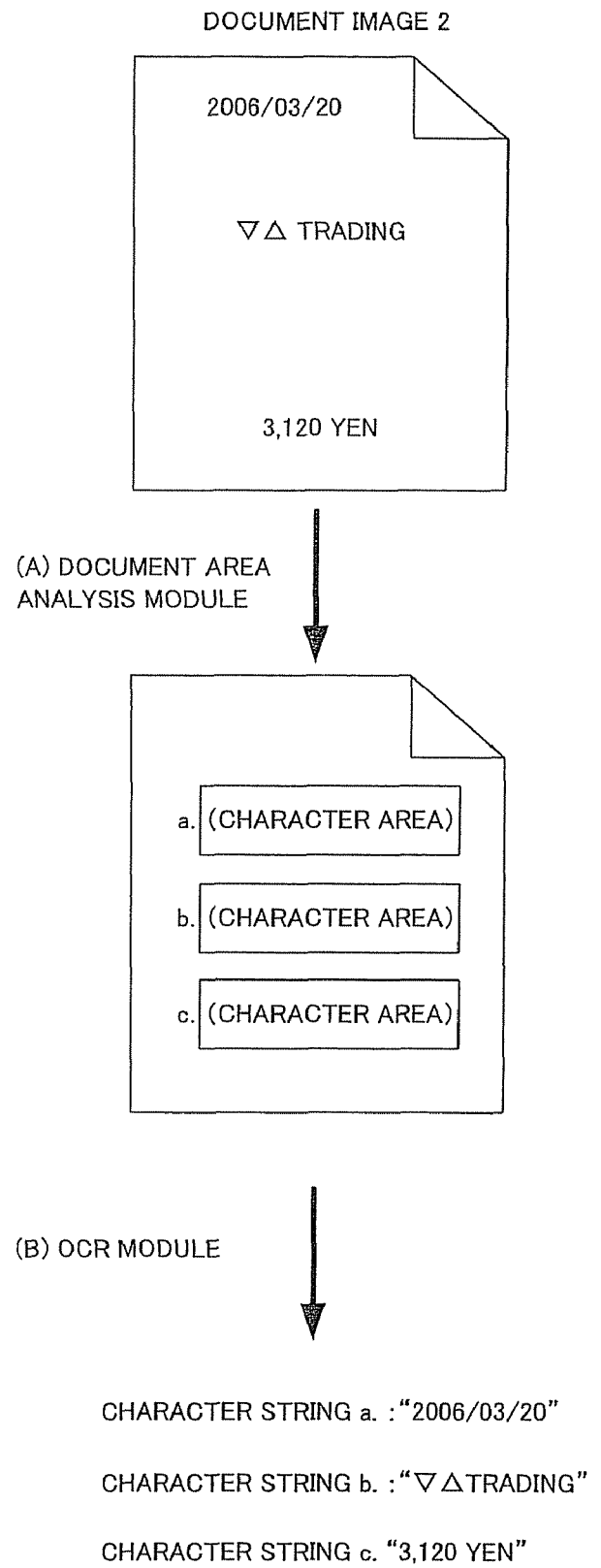
FIG. 13 is a view showing a flow of processing in which a new document image 2 is analyzed.

Document image area analysis is carried out on this new document image 2 by the document area analysis module (A) and the OCR module (B), as shown in FIG. 13, and text information is extracted from character areas (Flow 3-3). This flow is the same as the flow described with reference to FIG. 2 and therefore will not be described further in detail.

Next, the user is allowed to select and designate whether the semantic area information of the document image 2 should be compared and analyzed, using the template setting that has already been registered by the user in the semantic area information setting storage module (G) (Flow 3-4). As an exemplary method for this designation, it can be designated in advance such that comparison with proper template setting is applied when starting the processing of the document image 2. That is, it can be designated such that, if the processing of the document image 2 is reading by a scanner, analysis is made using a template as a parameter in scanning. Other than this, procedures of briefly confirming the image by the user at the time when the data of the image 2 is acquired as a result of the reading by the scanner, and then designating a template to be applied and making analysis, can be followed.

If comparison by using a template is designated by the user (Flow 3-4, Y), the semantic area information setting calling module (H) calls the corresponding template information from the semantic area information setting storage module (G) (Flow 3-5). Here, template setting of "estimate 1" is called, as shown in FIG. 10. Since the semantic area information setting storage module (G) manages information related to areas as template setting, this information, too, is acquired as comparison target information.

The called semantic area information comparison module (I) compares the acquired area information with the area information of the new document image 2 acquired in Flow 3-3 (Flow 3-6). Here, as the coordinate information is compared, it can be determined which area is a semantic area of the new image 2. In the comparison, since the coordinate values may slightly differ depending on the conditions under which the image is read by a scanner or the like, a certain range of difference may be allowed. This work enables acquisition of the semantic area information from the document image 2.

This acquired semantic area information can be stored in the semantic area information management module (D) (Flow 3-7). Here, the information of the new document image 2 is stored in a database as shown in FIG. 14.

Here, the processing of comparing the area information in the template with the area information of the new document image to acquire the semantic area information has been described. However, the semantic area information can be similarly acquired by comparing the text information in the template with the text information of the new document image extracted together with the area information in Flow 3-3.

Third Embodiment

Figure 15:
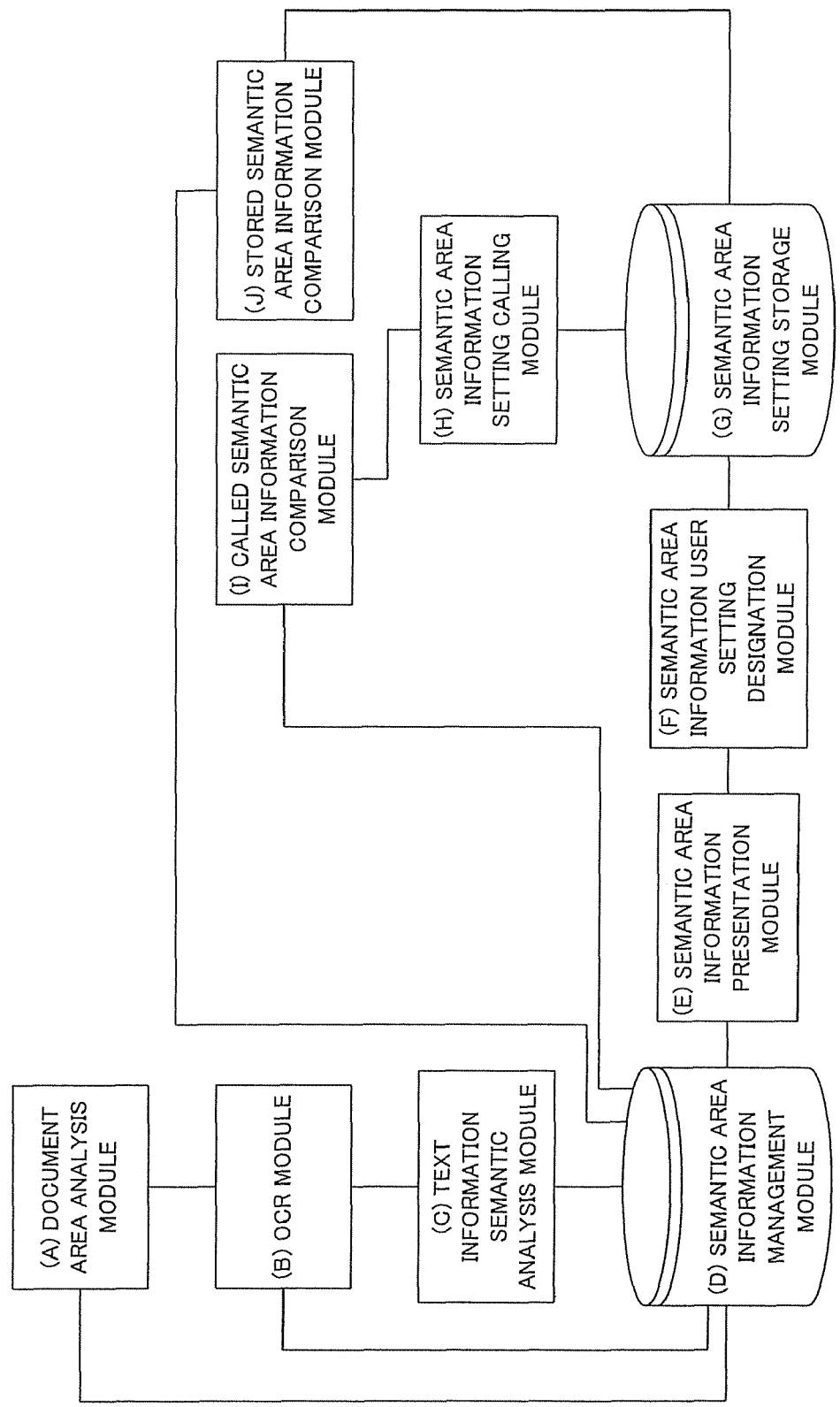
FIG. 15 is a block diagram showing the configuration of a document management apparatus according to a third embodiment of the invention.

FIG. 15 is a view showing the configuration of a document management apparatus according to a third embodiment. In the block diagram of FIG. 15, a stored semantic area information comparison module (J) is added to the block diagram of FIG. 8.

Here, the semantic area information setting storage module (G) is equivalent to a document type setting unit of the invention. The stored semantic area information comparison module (J) is equivalent to a document type determining unit of the invention.

Figure 16:
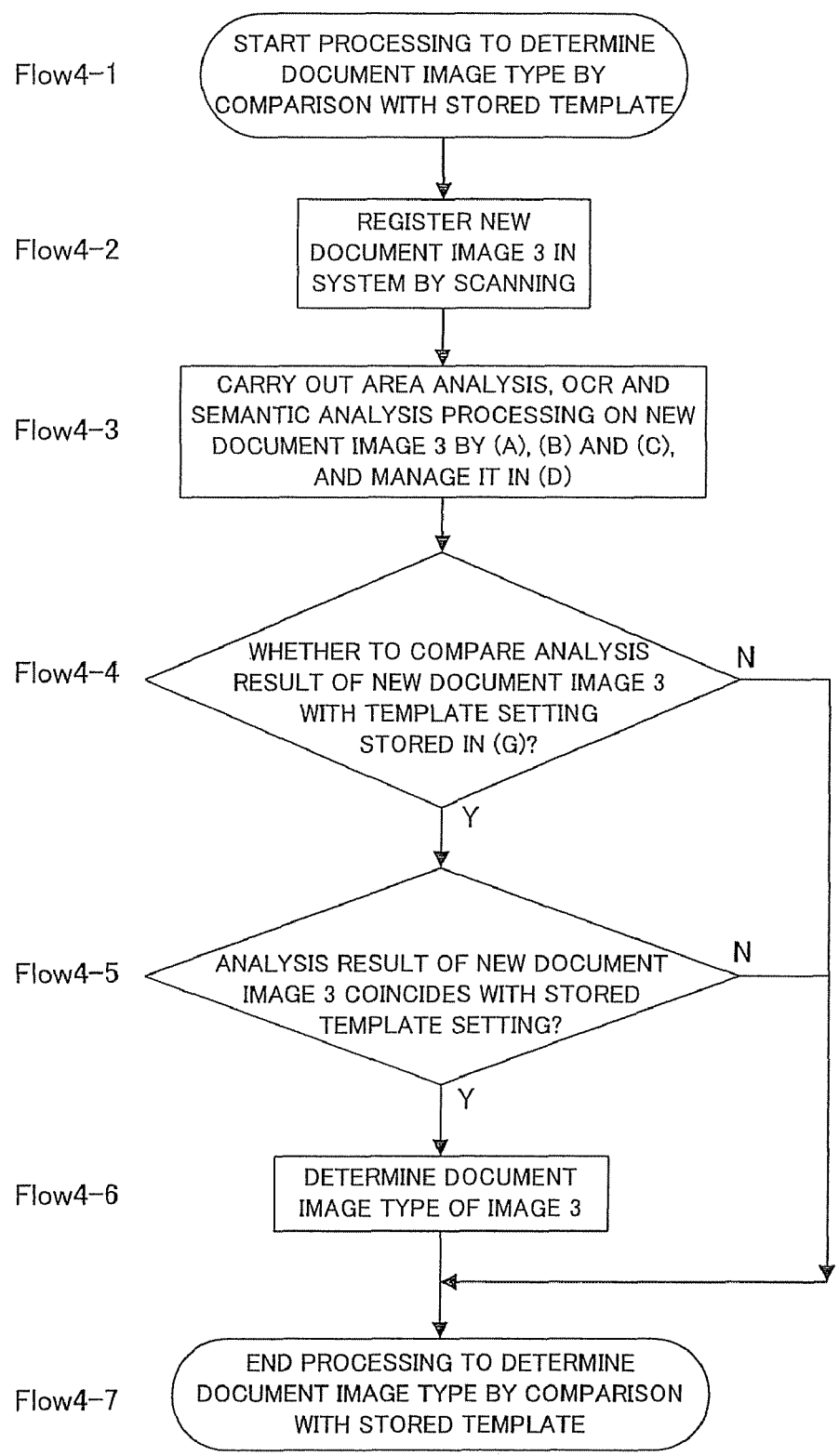
FIG. 16 is a flowchart showing an operation of document image type determination processing by comparison with saved templates.

In this third embodiment, processing in which, if the content designated by the user for setting of semantic area information in the first embodiment is stored as a template in the semantic area information setting storage module (G), comparison with the setting format is made and the document type is determined, will be described with reference to the flowchart of FIG. 16.

First, as the processing is started (Flow 4-1), a new document image 3 is registered in the system by an input device such as a scanner (Flow 4-2).

Figure 17:
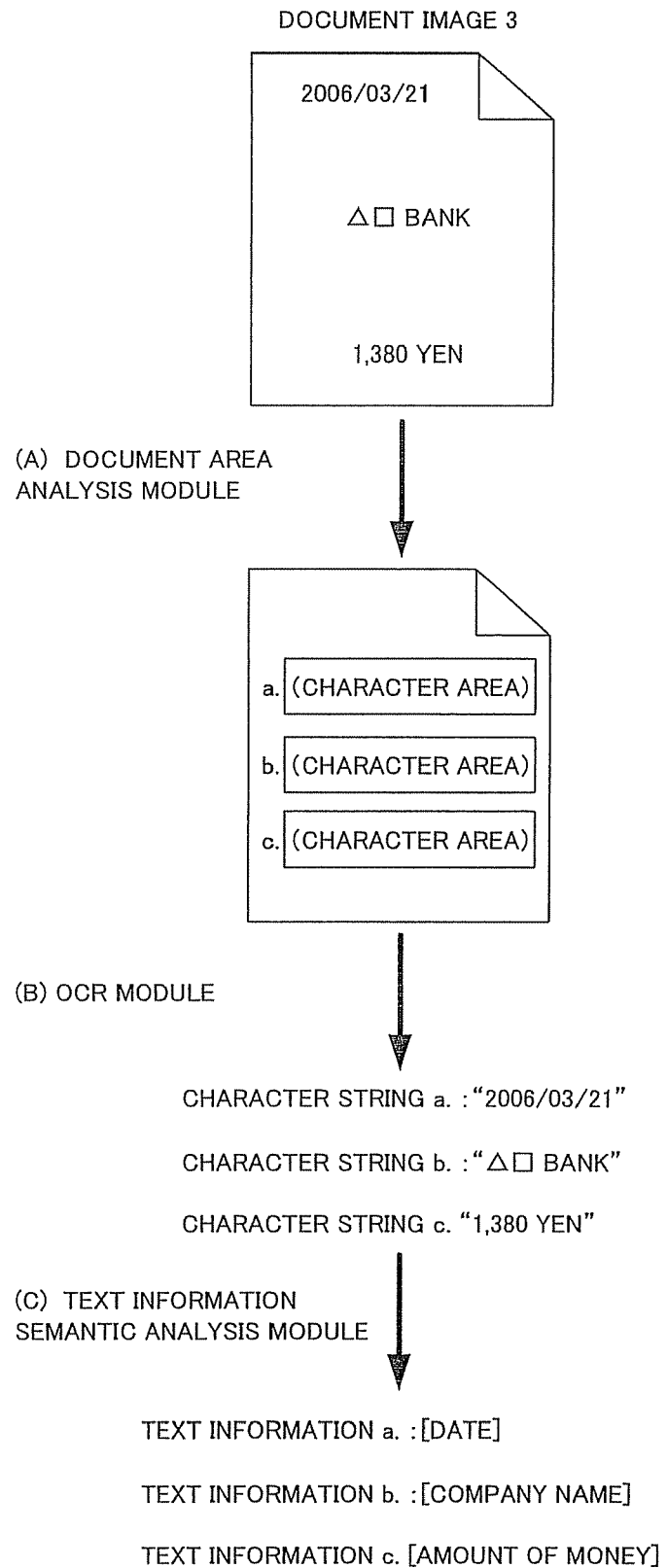
FIG. 17 is a view showing a flow of processing in which a new document image 3 is analyzed.

On this new document image 3, document image area analysis, extraction of text information from a character area, and text information semantic analysis are carried out by the document area analysis module (A), the OCR module (B) and the text information semantic analysis module (C), as shown in FIG. 17, and the information is managed by the semantic area information management module (D) as integrated information associating each piece of information (Flow 4-3). This flow is the same as the flow described with reference to FIG. 2 and therefore will not be described further in detail.

The state of the information managed by the semantic area information management module (D) is shown in FIG. 18.

Here, the user is allowed to designate whether the semantic area information of this document image 3 should be compared and analyzed, using the template setting already registered in the semantic area information setting storage module (G) (Flow 4-4). As an exemplary method for this designation, it can be designated in advance such that comparison with stored template setting is applied when starting the processing of the document image 3. That is, it can be designated such that, if the processing to the document image 3 is reading by a scanner, the document type is determined by applying comparison with a stored template as a parameter in carrying out scanning. Other than this, procedures of comparing the image with a stored template by the user when the data of the image 3 is acquired as a result of the reading by the scanner, to allow the user to designate determination of the document, can be taken.

If comparison with a stored template is designated (Flow 4-4, Y), the stored semantic area information comparison module (J) make comparison with the template information stored in the semantic area information setting storage module (G) (Flow 4-5). It is assumed that, as a result, the document image coincides with the template setting of "estimate 1" shown in FIG. 11. Here, as the coordinate area information is compared, each semantic area of the new document image 3 can be compared. In the comparison, since the coordinate values may slightly differ or recognition errors may occur in semantic analysis of text information depending on the conditions under which the image is read by a scanner or the like, a certain range of difference may be allowed. This work enables determination that the document type of the document image 3 is "estimate 1" (Flow 4-6).

Here, the processing of comparing the area information in the template with the area information of the new document image to determine the document type has been described. However, the document type can be similarly determined by comparing the integrated information in the template with the integrated information of the new document image acquired in Flow 4-3.

In this embodiment, only the process of determining the document type has been described. However, the document image that has been thus determined may be used, for example, by being sent to a work flow according to the document type or stored in a storage place according to the document image type.

Fourth Embodiment

Figure 19:
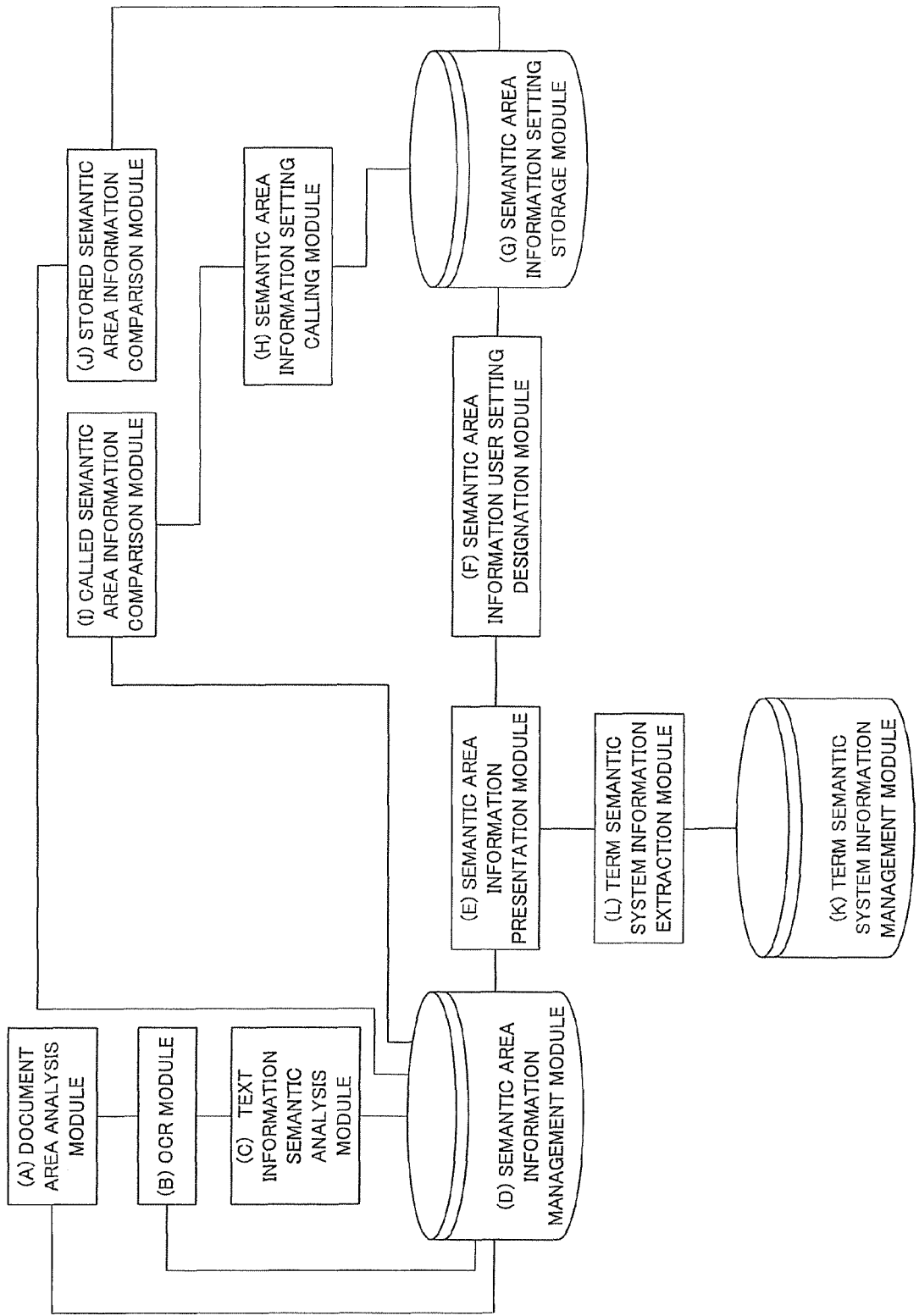
FIG. 19 is a block diagram showing the configuration of a document management apparatus according to a fourth embodiment of the invention.

FIG. 19 is a block diagram showing the configuration of a document management apparatus according to a fourth embodiment. In the block diagram of FIG. 19, a term semantic system information management module (K) and a term semantic system information extraction module (L) are added to the block diagram of FIG. 15.

The term semantic system information management module (K) is equivalent to a term semantic system information managing unit of the invention. The term semantic system information extraction module (L) is equivalent to a term semantic system information extracting unit of the invention.

Figure 20:
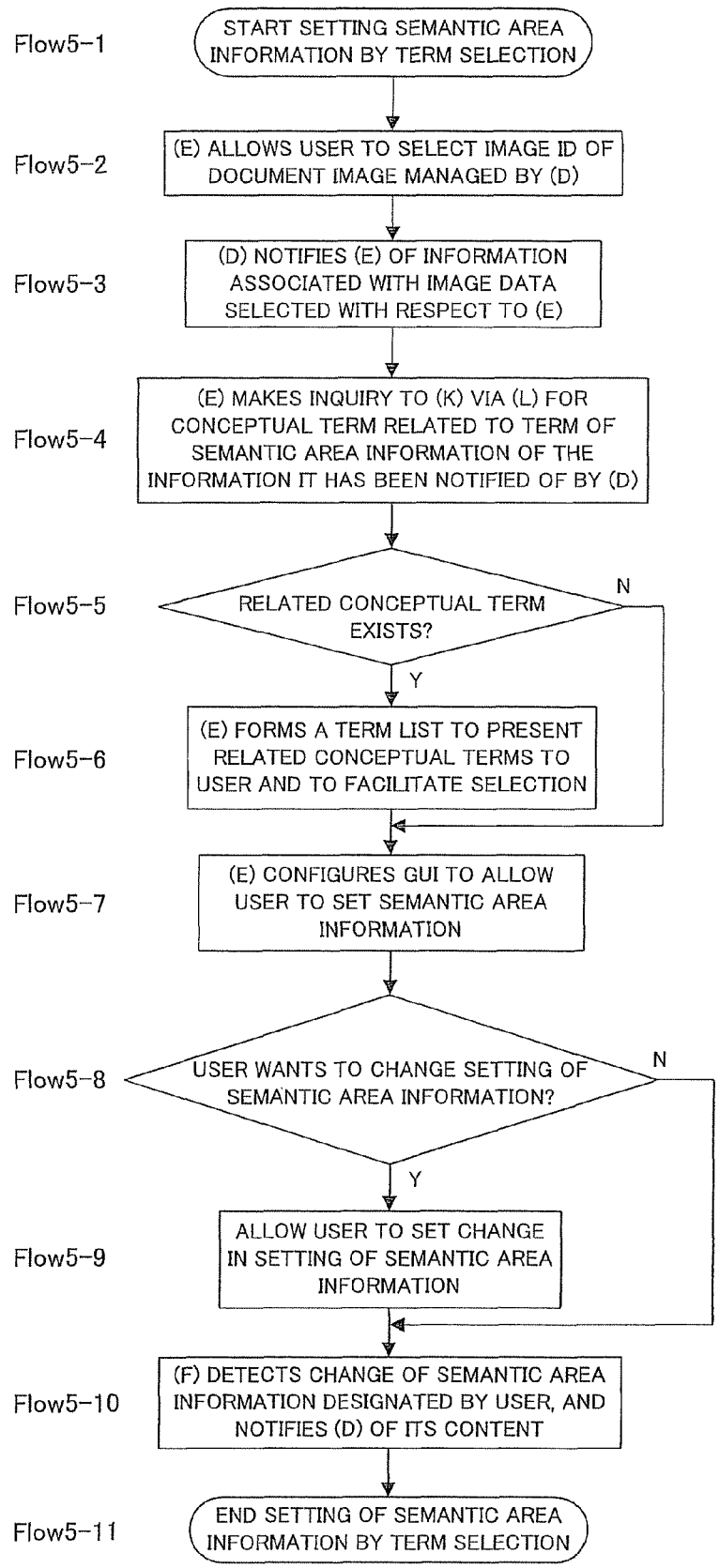
FIG. 20 is a flowchart showing a processing operation in the fourth embodiment of the invention.

In the fourth embodiment, a process in which, when the user designates setting of semantic area information, candidate terms of semantic area information to be set are acquired via the term semantic system information extraction module (L) from the terms managed by the term semantic system information management module (K), and the semantic area information presentation module (E) presents them to the user and allows the user to select one to enable easy designation of user setting of semantic area information, will be described with reference to the flowchart of FIG. 20.

Figure 21:
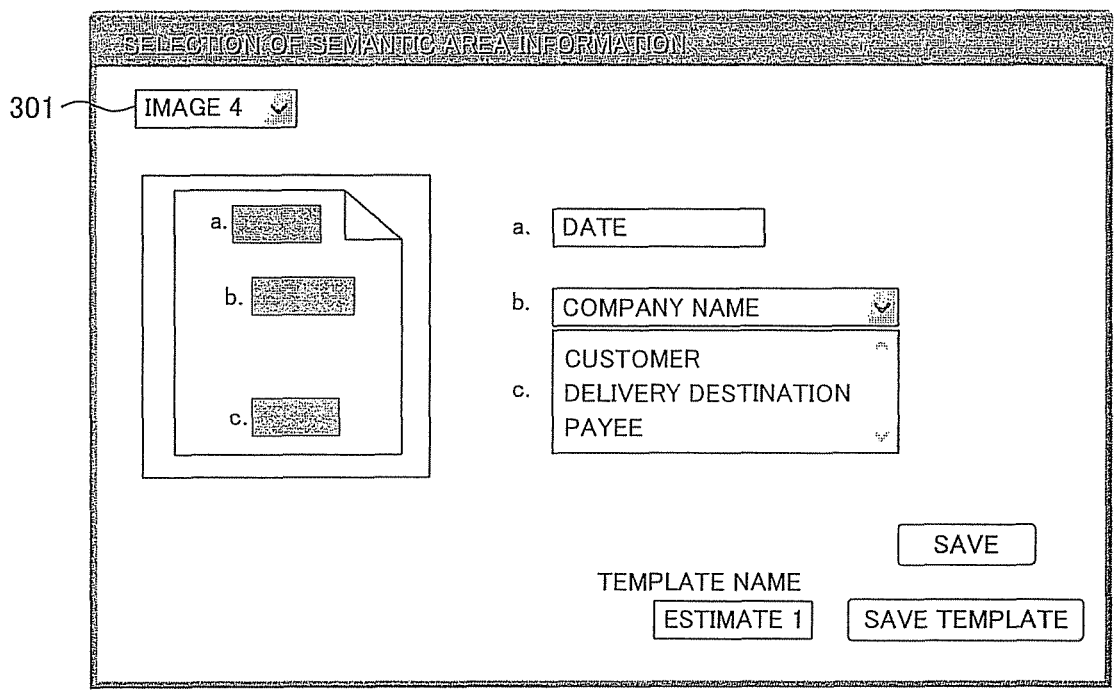
FIG. 21 shows an exemplary GUI when a user is caused to select image ID of a document image managed by the semantic area information management module.

First, when the processing is started (Flow 5-1), the semantic area information presentation module (E) allows the user to select the image ID of a document image managed by the semantic area information management module (D) (Flow 5-2). In this case, it is assumed that a drop-down list of a GUI indicated by 301 in FIG. 21 is presented to the user and the user is thus allowed to select the image ID and designated the corresponding image.

As the user selects an image 4, the semantic area information management module (D) notifies the semantic area information presentation module (E) of information about the area associated with the image ID of the image of the corresponding semantics (Flow 5-3). Here, the semantic area information presentation module (E) is notified of information such as the coordinates, area type, text information and semantic area information of the areas a, b and c.

Figure 22:
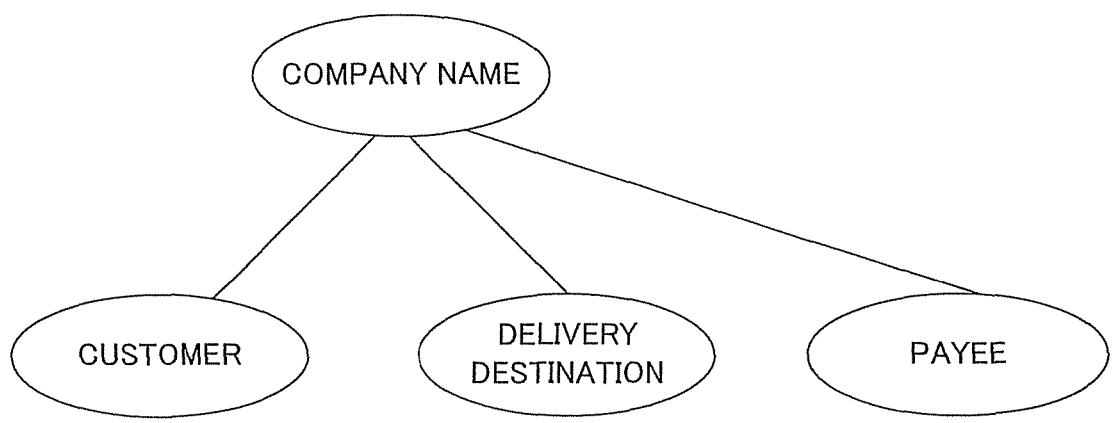
FIG. 22 shows schematic exemplary conceptual relationships of broader and narrower terms managed in a term semantic system information management module.

Next, the semantic area information presentation module (E) makes an inquiry for conceptual terms related to the terms of the semantic area information which it has been notified of, to the term semantic system information management module (K) via the term semantic system information extraction module (L) (Flow 5-4). For example, in the term semantic system information management module (K), with respect to a term "company name" which the semantic area information presentation module (E) is notified of, narrower terms such as "customer", "delivery destination", and "payee" are managed (FIG. 22). FIG. 22 schematically shows the conceptual hierarchical relation. Practically, such conceptual relations are managed by a table in a database or described in XML.

Here, if there is a related conceptual term (Flow 5-5, Y), the semantic area information presentation module (E) presents the related conceptual term to the user and forms a term list to facilitate the user to select a term (Flow 5-6). In this case, a list of narrower terms "customer", "delivery destination", and "payee" that can be choices is formed with respect to the broader term "company name".

The semantic area information presentation module (E) configures a GUI to allow the user to set semantic area information on the basis of the area information which it has been notified of and the term list formed in Flow 5-6 (Flow 5-7). Here, as shown in FIG. 21, a picture image of an image 4 is displayed and areas together with area IDs are displayed on the picture image in accordance with the coordinate information of the areas. Also the semantic area information of each area is displayed. In this case, it is shown that the area a indicates "date", the area b indicates "company name", and the area c indicates "amount of money". Moreover, since the narrower terms "customer", "delivery destination", and "payee" with respect to the "company name" in the area b are formed in Flow 5-6, a GUI is formed that indicates that there are choices of "customer", "delivery destination", and "payee" in addition to the semantic area information of "company name".

Now, if the user wants to change the setting of the semantic area information of these areas (if the user's wish is determined by the semantic area information presentation module (E)) (Flow 5-8, Y), the semantic area information presentation module (E) can allow the user to set the change (Flow 5-9).

For example, if the user wants to change the semantic area information of "company name" set for the area b to the semantic area information of "delivery destination", the user can select "deliver destination" from the list of settings of the semantic area information for the area b presented by the semantic area information presentation module (E) and press the "save" button, thereby changing the semantic area information.

The semantic area information user setting designation module (F) detects the change in the setting of the semantic area information designated by the user, then notifies the semantic area information management module (D) of the content, and changes the content managed by the semantic area information management module (D) (Flow 5-10). At this time, the information managed by the semantic area information management module (D) is stored as shown in FIG. 23.

The document area analyzing means, the text information analyzing means, the text information semantic analysis means, the managing means, the integrated information presenting means, and the user-designated semantic setting means described in the embodiments can also be applied to a program that causes a computer to execute the document management method described with reference to the flowcharts in the embodiments. This program is recorded on a computer-readable recording medium. It has the function causing the computer to execute the document management method of the invention by being read by the computer. With respect to such functions, the case where the functions to carry out the invention have already been recorded within the apparatus, is described in the embodiments. However, the functions are not limited to this form. The similar functions may be downloaded to the apparatus from a network, or the similar functions stored on a recording medium may be installed into the apparatus. As the recording medium, any form of medium may be employed as long as it can store programs like CD-ROM and can be read by the apparatus. Also, the functions thus acquired in advance by installing or downloading may be realized in cooperation with the operating system (OS) or the like in the apparatus.

What is claimed is:

1. A document management apparatus for processing, managing, and re-using newly taken image data in accordance with users needs, comprising:
   a document area analyzing unit configured to analyze and extract a document area from image data;
   a text information analyzing unit configured to analyze and extract text information with respect to the document area extracted by the document area analyzing unit;
   a text information semantic analysis unit configured to analyze and extract semantics of the text information from the text information extracted by the text information analyzing unit;
   a managing unit configured to associate the document area extracted by the document area analyzing unit, the text information extracted by the text information analyzing unit and the semantics of the text information extracted by the text information analyzing unit with each other, and manage them as integrated information;
   an integrated information presenting unit configured to present to a user at least the semantics of the text information, of the integrated information managed by the managing unit; and
   a user-designated semantic setting unit configured to be capable of allowing the user to change the semantics of the text information presented by the integrated information presenting unit and to set the changed semantics,
   wherein the document area, the text information and the semantics of the text information are managed as integrated information in a database.

2. The document management apparatus according to claim 1, comprising a template managing unit configured to be capable of creating and managing a template of a format having a document layout structure on the basis of the integrated information including the semantics of the text information designated by the user-designated semantic setting unit.

3. The document management apparatus according to claim 2, comprising a semantic estimating unit configured to compare a document area of new image data analyzed by the document area analyzing unit with a document area of the template managed by the template managing unit, and estimate and acquire semantics of text information included in the new image data as semantics of text information included in the template on the basis of the result of the comparison.

4. The document management apparatus according to claim 3, wherein the semantic estimating unit further compares text information of the new image analyzed by the text information analyzing unit with text information of a template managed by the template managing unit, and estimates and acquires semantics of the text information included in the new image data as semantics of the text information included in the template on the basis of the result of the comparison 5. The document management apparatus according to claim 2, comprising a document type setting unit configured to set a document type of the template, and a document type determining unit configured to compare a document area of new image data analyzed by the document area analyzing unit with a document area of a template managed by the template managing unit, and determine a type of a document included in the new image data from a document type provided for the template on the basis of the result of the comparison.

6. The document management apparatus according to claim2, comprising a document type setting unit configured to set a document type of the template, and a document type determining unit configured to compare the integrated information acquired from new image data with information corresponding to the integrated information included in the template, and determine a type of document included in the new image data from a document type provided for the template on the basis of the result of the comparison.

7. The document management apparatus according to claim1, comprising a term semantic system information managing unit configured to manage plural terms as a conceptual semantic system, and a term semantic system information extracting unit configured to extract a conceptually related term from the term semantic system managed by the term semantic system information managing unit, wherein the user-designated semantic setting unit causes predetermined semantics to be designated from the term semantic system extracted by the term semantic system information extracting unit.

8. A document management apparatus for processing, managing, and re-using newly taken image data in accordance with users needs, comprising:

document area analyzing means for analyzing and extracting a document area from image data;

text information analyzing means for analyzing and extracting text information with respect to the document area extracted by the document area analyzing means;

text information semantic analysis means for analyzing and extracting semantics of the text information from the text information extracted by the text information analyzing means;

managing means for associating the document area extracted by the document area analyzing means, the text information extracted by the text information analyzing means and the semantics of the text information extracted by the text information analyzing means with each other, and managing them as integrated information;

integrated information presenting means for presenting to a user at least the semantics of the text information, of the integrated information managed by the managing means; and user-designated semantic setting means for allowing the user to change the semantics of the text information presented by the integrated information presenting means, and setting the changed semantics, wherein the document area, the text information and the semantics of the text information are managed as integrated information in a database.

9. The document management apparatus according to claim 8, comprising template managing means for creating and managing a template of a format having a document layout structure on the basis of the integrated information including the semantics of the text information designated by the user-designated semantic setting means.

10. The document management apparatus according to claim 9, comprising semantic estimating means for comparing a document area of new image data analyzed by the document area analyzing means with a document area of the template managed by the template managing means, and estimating and acquiring semantics of text information included in the new image data as semantics of text information included in the template on the basis of the result of the comparison.

11. The document management apparatus according to claim 10, wherein the semantic estimating means further compares text information of the new image analyzed by the text information analyzing means with text information of a template managed by the template managing means, and estimates and acquires semantics of the text information included in the new image data as semantics of the text information included in the template on the basis of the result of the comparison.

12. The document management apparatus according to claim 9, comprising document type setting means for setting a document type of the template, and document type determining means for comparing a document area of new image data analyzed by the document area analyzing means with a document area of a template managed by the template managing means, and determining a type of a document included in the new image data from a document type provided for the template on the basis of the result of the comparison.

13. The document management apparatus according to claim 9, comprising document type setting means for setting a document type of the template, and document type determining means for comparing the integrated information acquired from new image data with information corresponding to the integrated information included in the template, and determining a type of document included in the new image data from a document type provided for the template on the basis of the result of the comparison.

14. The document management apparatus according to claim 8, comprising term semantic system information managing means for managing plural terms as a conceptual semantic system, and term semantic system information extracting means for extracting a conceptually related term from the term semantic system managed by the term semantic system information managing means, wherein the user-designated semantic setting means causes predetermined semantics to be designated from the term semantic system extracted by the term semantic system information extracting means.

15. A document management method for processing, managing, and re-using newly taken image data in accordance with users needs, comprising:
    analyzing and extracting a document area from image data;
    analyzing and extracting text information with respect to the document area;
    analyzing and extracting semantics of the text information from the text information;
    associating the extracted document area, the text information and the semantics of the text information extracted by analyzing the semantics of the text information with each other, and managing them as integrated information;
    presenting to a user at least the semantics of the text information, of the integrated information; and
    allowing the user to change the semantics of the presented text information and setting the changed semantics,
    wherein the document area, the text information and the semantics of the text information are managed as integrated information in a database.

16. The document management method according to claim 15, wherein a template of a format having a document layout structure is created and managed on the basis of the integrated information including the semantics of the text information.

17. The document management method according to claim 16, wherein the document area of new image data is compared with a document area of the template, and semantics of text information included in the new image data is estimated and acquired as semantics of text information included in the template on the basis of the result of the comparison.

18. The document management method according to claim 17, wherein, further, the text information of the new image is compared with text information of a template, and semantics of the text information included in the new image data is estimated and acquired as semantics of the text information included in the template on the basis of the result of the comparison.

19. The document management method according to claim 16, wherein a document type is set for the template, and
    the document area of new image data is compared with a document area of a template, and a type of a document included in the new image data is determined from a document type provided for the template on the basis of the result of the comparison.

20. The document management method according to claim 16, wherein a document type is set for the template, and
    the integrated information acquired from new image data is compared with information corresponding to the integrated information included in the template, and a type of document included in the new image data is determined from a document type provided for the template on the basis of the result of the comparison.

* * * * *